Patented Mar. 16, 1937

2,074,169

UNITED STATES PATENT OFFICE 2,074,169

FUNGICIDES

William McIlvaine Dickson, Woodside, Del., assignor to General Chemical Company, New York, N. Y., a corporation of New York No Drawing. Application July 21, 1932, Serial No. 623,905

7 Claims. (Cl. 167—21)

This invention relates to fungicides. The principal object of the invention lies in the provision of fungicides for effectively controlling fungus diseases, particularly of pome fruits, without injury to fruit or foliage, especially under climatic conditions of high temperature and moisture. The invention also includes methods for making the improved products.

Fungicides comprising the invention involve compositions obtainable by reacting sulfur and lime-sulfur solution. Heretofore, sulfur has been used either alone or in various combinations in fungicides, and lime-sulfur solution has been extensively employed as a fungicide. Lime-sulfur solution when customarily utilized as a spray, in many instances tends to cause burning of foliage and injury to fruit. Finely divided ordinary sulfur is substantially non-wettable in water and consequently cannot be suspended in water satisfactorily and sprayed on foliage and fruit. Neither can it be dusted satisfactorily because it has a strong tendency to cling together in balls or lumps. With the latter deficiencies of sulfur in view, prior suggestions have been made with respect to the provision of sulfur compositions which are readily wetted and suspended in water and which, when sprayed, will adhere more tenaciously to fruit and foliage. Prior proposals have also been made with respect to the provision of sulfur dusting compositions which do not ball or lump like finely divided ordinary sulfur and which adhere more tenaciously to fruit and foliage. Such compounds have, in some cases, been composed of mixtures of sulfur and substances rendering sulfur wettable when a wettable compound was desired, or substances rendering sulfur free flowing when a dusting compound was desired.

I have found that by forming a composition of sulfur, preferably sulfur made wettable by the addition of sulfur wetting material, and a lime-sulfur solution, a superior product is obtained which is remarkably effective with respect to scab control, and which does not cause injury to fruit or foliage. Although the present improvements contemplate the employment of finely divided elemental sulfur, in accordance with the more advantageous embodiments of the invention, the sulfur utilized is preferably a composition of sulfur and sulfur wetting material, or a sulfur which is inherently wettable, such as flotation sulfur. The lime-sulfur solution referred to is the ordinary 32° Bé. lime-sulfur solution of commerce.

Since ordinary finely divided, non-wettable sulfur may be made wettable by admixture with suitable wetting agents, it is preferred to utilize this type of sulfur because of its availability. The invention aims to provide fungicides which may be used as dust or in a spray solution. Hence, it is preferred to include, in addition to sulfur wetting agents, substances which make the final product free-flowing, such substances having the additional advantage that suspensibility of the product in a spray solution is increased.

In accordance with the preferred modification of the invention, the improved product may be made by forming a sulfur mixture of soap bark, aluminum resinate, powdered soap and a predominating quantity of finely divided sulfur, adding lime-sulfur solution thereto, thoroughly agitating the resulting mixture, and finally drying the product so formed. For convenience in the following discussion, a composition comprising sulfur and a wetting agent, with or without a material imparting free-flowing properties to the product, is termed a "sulfur-mixture".

One specific example of carrying out the method of the invention for making the product thereof, is as follows. A sulfur mixture is made up by agitating 90 parts sulfur, preferably of about 300 mesh, 5 parts ground soap bark, 4 parts aluminum resinate, and one part castile soap powder in a mixture machine for about 45 minutes. There is then added to the sulfur mixture 25 parts by weight of a 32° Bé. lime-sulfur solution, and mixing is continued for about 30–45 minutes. The product mass thus obtained, while not pasty, is damp, and is then dried and ground. It appears that a chemical reaction takes place between the sulfur mixture and the lime-sulfur solution, although the character of this reaction is not fully understood.

When the soap bark is mixed with sulfur, the latter is made wettable, and consequently mixes easily with water, thus making it possible to suspend the ultimate fungicidal composition in water and have it spread better when sprayed onto foliage. The powdered soap also acts as a sulfur wetting agent, and aids the soap bark in wetting the sulfur. Aside from making the final product wettable in use in the field, the admixture of one or more wetting agents with the sulfur, where a non-wettable sulfur is employed, in the sulfur mixture prior to the addition of the lime-sulfur solution is an important feature of the invention, since the association of sulfur wetting material with the sulfur of the mixture, rendering the sulfur wettable before the addition of the lime-sulfur solution, appears to be an important factor in facilitating and promoting the apparent reaction taking place between the sulfur and the lime-sulfur solution.

The proportions of wetting materials included in the sulfur mixture may vary considerably, sufficient wetting agent being employed to impart wetting properties to the sulfur. Ordinarily, satisfactory results may be obtained by using a wetting agent, such as soap bark, in quantities ranging from 1 to 5%.

In place of soap bark, various other vegetable barks or leaves, berries, roots or herbs may be employed, such as barks of white pine, prickly ash, white ash, red oak, white poplar, cottonwood, dogwood; leaves such as buck bean, witch hazel, digitalis; also licorice root, laurel berries and prickly ash berries. The proportions may vary somewhat depending on the particular material used and the results may not, in all cases, be equal to those obtained by the use of soap bark.

The addition of aluminum resinate to the sulfur mixture will cause the dried, final product to flow more freely when dusted, and to stick to the leaves more firmly, and further will enable the fungicide to go into a much higher degree of suspension when used in a spray and also to stick more readily to the leaves. In place of aluminum resinate, resinates such as alkali resinates, alkali earth resinates, and resinates of lead, manganese or zinc, may be employed. Although the amount of resinate incorporated into the mix may vary, satisfactory results may be obtained where not more than about 5% aluminum resinate is included in the sulfur mixture.

The sulfur content of the sulfur mixture may run as high as 97-98% depending upon the amount of wetting agent employed, and whether or not substances such as aluminum resinate are included in the mix. Generally speaking, however, the quantity of non-wettable sulfur included in the mixture is not substantially less than about 90%. In instances where the sulfur employed is inherently wettable, such as flotation sulfur, the use of additional wetting agents may not be desired, and the sulfur content of the mix is then dependent upon whether or not substances such as aluminum resinate are utilized. Where the sulfur is inherently wettable and the aluminum resinate or equivalent substance is not included in the mix, it will be understoood that the sulfur and lime-sulfur solution are directly mixed together.

With regard to the proportions of sulfur mixture and lime-sulfur solution, it will be observed that in the above specific example 80 parts by weight of sulfur mixture and 20 parts by weight of lime-sulfur solution were admixed. My researches indicate that satisfactory results may be obtained in the field where the fungicides of the invention comprise reaction products of a major portion of sulfur mixture and a minor portion of lime-sulfur solution. In the preferred forms of the invention, however, not substantially less than about 70% and not substantially more than about 90% by weight of sulfur or sulfur mixture is employed, the balance comprising approximately 30-10% by weight of lime-sulfur solution. The improved products have been found to be particularly effective in scab control where the lime-sulfur solution content of the batch was about 20% by weight and preferably within the range 20-30%, the balance consisting of sulfur mixture, inherently wettable sulfur, or elemental sulfur, whichever may be used.

The lime-sulfur solution of the above composition is a 32° Bé. solution. Solutions of other concentrations may of course be utilized, in such instances, consideration being given to the concentration of the particular solution used in regulating the proportions of lime-sulfur solution involved in a batch. The lime-sulfur solution of the above example may be made up by boiling, for about one hour, 8 parts of unslacked lime and 50 parts of water with 16 parts of brimstone, and then filtering off the solution, the latter generally considered to be approximately $CaS_5$. One representative analysis of a lime-sulfur solution is as follows:

Degree Baumé @ 60° F____(minimum)__ 32
Calcium sulfide ($CaS_x$)_____do____ 29 %
Total sulfur_____do____ 24.7%
Lime (CaO) _____do____ 9.8%
Water and inert_____(maximum)__ 70.8%

Good results have been secured where the fungicide was the reaction product of a mixture containing about 80% elemental sulfur and 20% lime-sulfur solution. When working with elemental sulfur alone, that is, a sulfur not inherently wettable and not admixed with a sulfur wetting agent, it has been found that the sulfur and lime-sulfur solution should desirably be violently agitated to induce the apparent reaction between the sulfur and the lime-sulfur solution. Because of the facility with which such apparent chemical reaction takes place when sulfur wetting agent or an inherently wettable sulfur is employed, and because of the more satisfactory results obtained in the field, it is preferred, as noted above, to utilize a sulfur mixture containing sulfur and a sulfur wetting agent, or an inherently wettable sulfur.

The product of the invention may be made by reacting a paste form of sulfur with lime-sulfur solution. By paste form of sulfur is meant a mixture of sulfur and a relatively small quantity of water such as may be obtained, for example, in the flotation process for the recovery of sulfur from gases, after the bulk of the water has been removed. Such a paste may also be obtained by forming elemental sulfur in a suspension of water, as by the reaction of hydrogen sulfide and sulfur dioxide, and removing so much of the water as may be necessary to leave the sulfur in paste form.

The products of the invention may be applied in the field as dusts or sprays, either alone or in combination with insecticides such as lead arsenate, nicotine and others.

I claim:

1. A fungicidal composition obtainable by mixing a major portion of wettable sulfur, and a minor portion of lime-sulfur solution.

2. A composition comprising the product obtained by mixing a major portion of sulfur and a minor portion of lime-sulfur solution, and drying the mass.

3. A composition comprising the product obtained by mixing a major portion of wettable sulfur and a minor portion of lime-sulfur solution, and drying the resulting mass.

4. The method of making a fungicide which comprises forming a mixture of sulfur and sulfur wetting material, adding thereto a lesser portion by weight of lime-sulfur solution, agitating the resulting mixture, and drying the mass.

5. The method of making a fungicide which comprises forming a mixture containing sulfur wetting material and a predominating amount of sulfur, adding to the mixture so formed a lesser quantity by weight of lime-sulfur solution, agitating the resulting mixture, and drying the mass.

6. A fungicide prepared by forming a mixture containing soap bark, aluminum resinate, powdered soap and not less than about 90% sulfur, adding to not substantially less than about 70 parts by weight of the mixture so formed about 20-30 parts by weight lime-sulfur solution, agitating the resulting mixture, and drying the mass.

7. A composition comprising the reaction product of not less than about 70 parts by weight of a mixture containing soap bark, aluminum resinate, powdered soap, and not less than about 90% sulfur, and about 20-30 parts by weight lime-sulfur solution.

WILLIAM McILVAINE DICKSON.